(12) United States Patent
DeVaul et al.

(10) Patent No.: US 10,162,044 B2
(45) Date of Patent: Dec. 25, 2018

(54) BALLOON-BASED POSITIONING SYSTEM AND METHOD

(71) Applicant: X Development LLC, Mountain View, CA (US)

(72) Inventors: Richard Wayne DeVaul, Mountain View, CA (US); Waleed Kadous, Santa Clara, CA (US); Eric Teller, Palo Alto, CA (US); Cliff Biffle, Berkeley, CA (US); Edward Allen Keyes, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 156 days.

(21) Appl. No.: 15/019,772

(22) Filed: Feb. 9, 2016

(65) Prior Publication Data
US 2016/0154085 A1   Jun. 2, 2016

Related U.S. Application Data

(63) Continuation of application No. 13/628,990, filed on Sep. 27, 2012, now Pat. No. 9,285,450.

(51) Int. Cl.
*G01S 5/04* (2006.01)
*G01S 1/02* (2010.01)
(Continued)

(52) U.S. Cl.
CPC ............... *G01S 5/04* (2013.01); *G01S 1/02* (2013.01); *G01S 1/042* (2013.01); *G01S 1/20* (2013.01);
(Continued)

(58) Field of Classification Search
CPC ..... G01S 5/04; G01S 1/02; G01S 1/042; G01S 1/20; G01S 5/0284; G01S 19/03;
(Continued)

(56) References Cited

U.S. PATENT DOCUMENTS

| 44,445,120 | | 4/1984 | Rosenthal |
| 5,311,197 A | * | 5/1994 | Sorden ................. B60R 25/102 |
| | | | 342/357.31 |

(Continued)

FOREIGN PATENT DOCUMENTS

| WO | 1997015992 A1 | 5/1997 |
| WO | WO 2004/029649 A1 | 4/2004 |

OTHER PUBLICATIONS

Wikipedia Article, "Navigation", Aug. 2012 version.*

(Continued)

*Primary Examiner* — Frank J McGue
(74) *Attorney, Agent, or Firm* — Lerner, David, Littenberg, Krumholz & Mentlik, LLP

(57) ABSTRACT

Disclosed herein are embodiments of a balloon-based positioning system and method. In one example embodiment, a system includes at least three balloons, with each balloon including a position-determining module (PDM) and a position-broadcasting module (PBM). Each PDM is configured for determining a position of the respective balloon and each PBM is configured for broadcasting a balloon signal containing balloon-positioning data of the respective balloon. The balloon-positioning data includes the determined position of the respective balloon and a corresponding time of broadcast.

19 Claims, 8 Drawing Sheets

(51) Int. Cl.
*G01S 1/04* (2006.01)
*G01S 1/20* (2006.01)
*G01S 5/02* (2010.01)
*G01S 19/03* (2010.01)
*G01S 19/24* (2010.01)
G01S 5/00 (2006.01)
G01S 5/12 (2006.01)
G01S 5/14 (2006.01)
G01S 5/16 (2006.01)

(52) U.S. Cl.
CPC ............. *G01S 5/0284* (2013.01); *G01S 19/03* (2013.01); *G01S 19/24* (2013.01); *G01S 5/0045* (2013.01); *G01S 5/12* (2013.01); *G01S 5/14* (2013.01); *G01S 5/16* (2013.01)

(58) Field of Classification Search
CPC .......... G01S 19/24; G01S 5/0045; G01S 5/12; G01S 5/14
USPC ....................................................... 342/357.4
See application file for complete search history.

(56) References Cited

U.S. PATENT DOCUMENTS

| | | | | |
|---|---|---|---|---|
| 6,023,291 | A * | 2/2000 | Kamel | G01C 11/025 348/116 |
| 6,151,308 | A | 11/2000 | Ibanez-Meier et al. | |
| 6,167,263 | A * | 12/2000 | Campbell | B64B 1/06 244/164 |
| 6,430,416 | B1 * | 8/2002 | Loomis | G01S 19/46 342/357.43 |
| 7,155,238 | B2 | 12/2006 | Katz | |
| 7,272,495 | B2 | 9/2007 | Coluzzi et al. | |
| 7,844,218 | B2 | 11/2010 | Seligsohn et al. | |
| 7,913,948 | B2 | 3/2011 | Porter | |
| 2002/0167702 | A1 | 11/2002 | Badesha et al. | |
| 2005/0052318 | A1 | 3/2005 | Jendbro et al. | |
| 2006/0063529 | A1 | 3/2006 | Seligsohn et al. | |
| 2007/0194988 | A1 | 8/2007 | Matsuoka et al. | |
| 2007/0252761 | A1 | 11/2007 | Koorapaty et al. | |
| 2008/0103696 | A1 | 5/2008 | Cheok et al. | |
| 2011/0115812 | A1 * | 5/2011 | Minear | G06T 17/00 345/593 |
| 2012/0053757 | A1 * | 3/2012 | Breshears | G01S 5/0081 701/2 |
| 2012/0172061 | A1 | 7/2012 | Dods et al. | |
| 2015/0042793 | A1 * | 2/2015 | Belenkii | G01S 3/7867 348/143 |
| 2017/0067990 | A1 * | 3/2017 | Reed | G01S 13/42 |

OTHER PUBLICATIONS

Doyoon Kim et al., "Design of Efficient Navigation Message Format for UAV Pseudolite Navigation System," IEEE Transactions on Aeorspace and Electronic Systems, IEEE Service Center, Piscataway, NJ, US, vol. 44, No. 4, Oct. 1, 2008, pp. 1342-1344.

P. Gorham et al., "The Antarctic Impulsive Transient Antenna Ultra-High Energy Neutrino Detector Design, Performance, and Sensitivity for 2006-2007 Balloon Flight," ANITA Collaboration, Arxiv. Org., Cornell University Library, 201 Olin Library Cornell University Ithaca, NY 14853, Dec. 10, 2008, pp. 16-17.

Extended European Search Report issued in co-pending European Patent Application No. EP 13841825.6, European Patent Office, dated Apr. 22, 2016, 11 pages.

Written Opinion of the International Searching Authority (PCT/ISA/237), dated Mar. 11, 2014, 7 pages.

Examination Report dated Sep. 4, 2018 for European Patent Application No. 13841825.6. 5 pages.

* cited by examiner

BALLOON-BASED POSITIONING SYSTEM AND METHOD

PRIORITY

This disclosure is a continuation of U.S. patent application Ser. No. 13/628,990 filed on Sep. 27, 2012.

BACKGROUND

Unless otherwise indicated herein, the materials described in this section are not prior art to the claims in this application and are not admitted to be prior art by inclusion in this section.

Many positioning systems exist that help determine a position of a device. One of the most commonly used positioning systems is the Global Positioning System (GPS), which is maintained by the United States government. The GPS is a satellite-based system that provides positioning information to ground-based receivers located throughout the world. The GPS include a fleet of thirty-two atomic clock satellites. Each satellite orbits the earth and broadcasts a signal containing satellite-positioning data for the respective satellite. A given receiver then receives signals from different satellites, and processes the collective satellite-positioning data contained therein to determine the receiver's position. However, for a variety of reasons, the receiver may be unable to receive one or more of these signals, or it may receive signals that have been distorted. As a result, receivers are often unable to accurately determine their position. Accordingly, improved positioning systems are desired.

SUMMARY

In one aspect, a system includes at least three balloons, with each balloon including a position-determining module (PDM) and a position-broadcasting module (PBM). Each PDM is configured for determining a position of the respective balloon and each PBM is configured for broadcasting a balloon signal containing balloon-positioning data of the respective balloon. The balloon-positioning data includes the determined position of the respective balloon and a corresponding time of broadcast.

In another aspect, a system includes at least three balloons, with each balloon including a position-determining module (PDM) and a position-broadcasting module (PBM). Each PDM includes a GPS receiver, and is configured for (i) receiving at least three satellite signals, each satellite signal from a respective one of at least three satellites, and each satellite signal including satellite-positioning data of the respective satellite, and (ii) determining a position of the respective balloon based on the satellite-positioning data of the at least three satellites. Each PBM is configured for broadcasting a balloon signal containing balloon-positioning data of the respective balloon. The balloon-positioning data includes the determined position of the respective balloon and a corresponding time of broadcast.

In a further aspect, a system includes at least three balloons, with each balloon including a position-determining module (PDM) and a position-broadcasting module (PBM). Each PDM is configured for determining a position of the respective balloon. One balloon of the at least three balloons is a first balloon, and the PDM of the first balloon is a first PDM. The first PDM is configured for determining a position of the first balloon based on a ground-station and a celestial object. Each PBM is configured for broadcasting a balloon signal containing balloon-positioning data of the respective balloon. The balloon-positioning data includes the determined position of the respective balloon and a corresponding time of broadcast.

In a further aspect, a method includes (i) determining a first position of a first balloon in a balloon network, (ii) determining a second position of a second balloon in the balloon network, (iii) determining a third position of a third balloon in the balloon network, (iv) broadcasting a first balloon signal, the first balloon signal including the determined first position and a corresponding time of broadcast, (v) broadcasting a second balloon signal, the second balloon signal including the determined second position and a corresponding time of broadcast, and (vi) broadcasting a third balloon signal, the third balloon signal including the determined third position and a corresponding time of broadcast.

DETAILED DESCRIPTION

Figure 1:
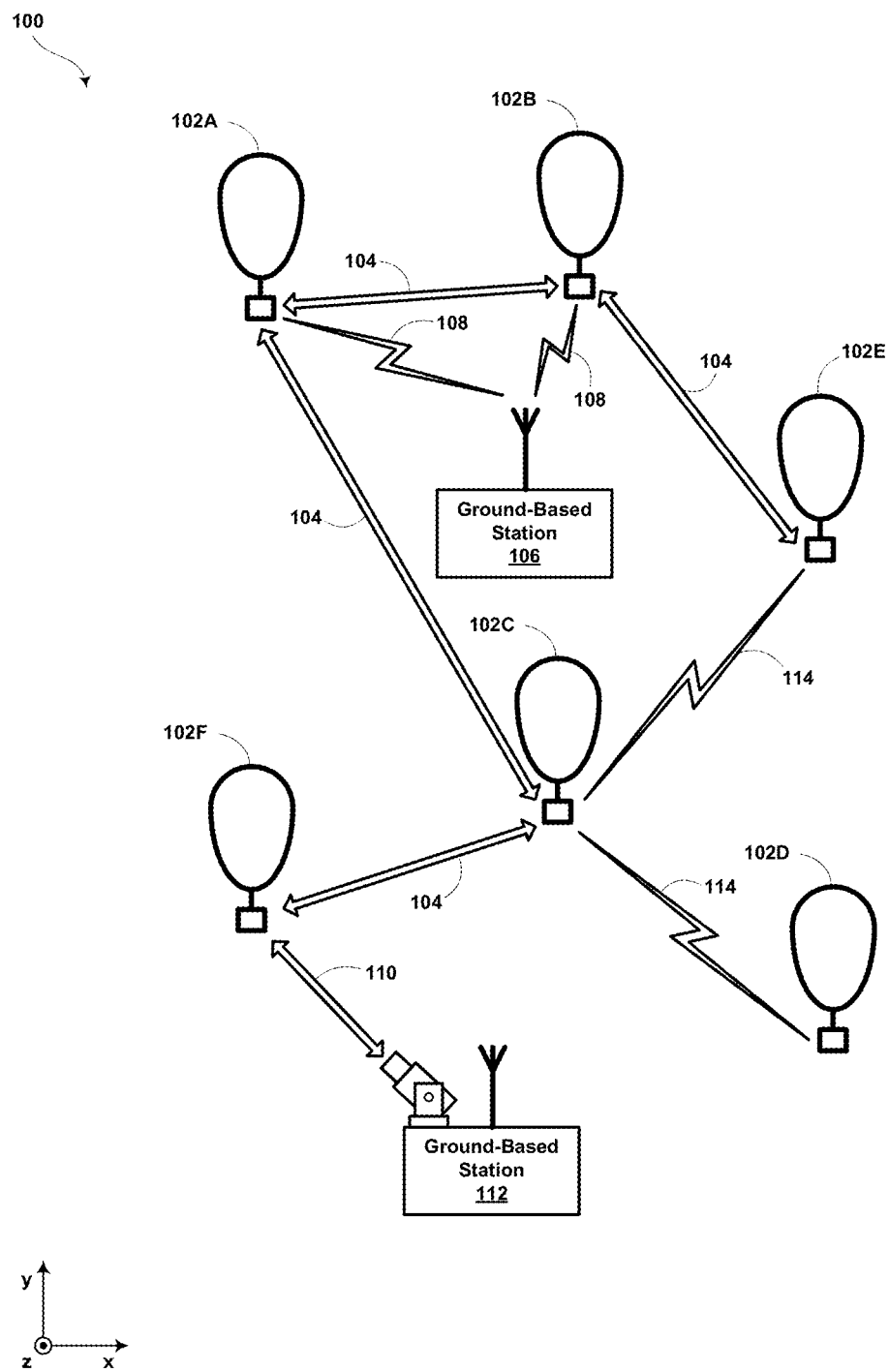
FIG. 1 is a simplified block diagram illustrating a balloon network, according to an example embodiment.

Illustrative embodiments of a balloon-based positioning system are described herein and are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are contemplated herein.

1. Overview

Embodiments of a balloon-based positioning system may be integrated with a balloon data network that includes a plurality of balloons; for example, a mesh network formed by high-altitude balloons deployed in the stratosphere. Since winds in the stratosphere may affect the positions of the balloons in a differential manner, each balloon in a network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

In one balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

One embodiment of a balloon-based positioning system includes a plurality of balloons with each balloon having a position-determining module (PDM) and a position-broadcasting module (PBM). Each PDM is configured for determining a position of the respective balloon, and each PBM is configured for broadcasting a balloon signal containing balloon-positioning data. The balloon-positioning data includes the determined position of the respective balloon and a corresponding time of broadcast (i.e., indicating when the balloon signal was broadcast). The system also includes a ground-based receiver that is configured to receive these balloon signals and determine its position based on the collective balloon-positioning data contained therein.

A PDM may be configured in a variety of manners to determine a position of the respective balloon. In one embodiment, a PDM may be configured to determine the position based on satellite-positioning data received from GPS satellites. In another embodiment, a PDM may be configured to determine the position based on a survey point such as a ground-based station and/or a celestial object. In another embodiment, a PDM may be configured to determine the position based on a relative position of the respective balloon with respect to another balloon.

Embodiments of a balloon-based positioning system may provide several advantages. As one example, the typical distance from a balloon to a ground-based receiver is relatively short, as compared to for example, the typical distance from a GPS satellite to a ground-based receiver. As a result, balloon signals are likely to be stronger, and are more likely to reach receivers, as compared to in a parallel GPS scenario.

As another example, the balloons are positioned beneath the ionosphere. As a result, the balloon signals need not traverse the ionosphere to reach ground-based receivers, and therefore they may avoid refraction-based interference that is caused by the ionosphere. Again, this means that balloon signals are likely to be stronger, and are more likely to reach receivers, as compared to in a parallel GPS scenario where satellite signals traverse the ionosphere.

Notably, to minimize the effects of refraction-based interference, satellite signals are typically broadcast simultaneously on two different channel frequencies. Since balloon signals avoid this type of interference, they may be broadcast on a single channel frequency. Among other things, this allows receivers to be less complex, as compared to those used in the GPS that must be configured to receiver signals on multiple channels.

While not necessary, some embodiments of a balloon-based positioning system may include a large number of balloons, including thousands, tens of thousands, or more. These embodiments provide a further advantage of increasing the likelihood that a given receiver will have a direct line-of-sight with one or more of the balloons. Accordingly, balloon signals are more likely to reach receivers, as compared to in a parallel GPS scenario where the GPS is limited by its fleet of thirty-two satellites.

It should be appreciated that the advantages provided above are merely examples and are non-limiting. Embodiments of a balloon-based positioning system may provide additional advantages, such as those described in greater detail throughout this disclosure, and/or those that would be apparent to one of ordinary skill in the art.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km. Additional advantages relating to this altitude range, particularly in connection with positioning-related features, are discussed in greater detail below.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical operations involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In one embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
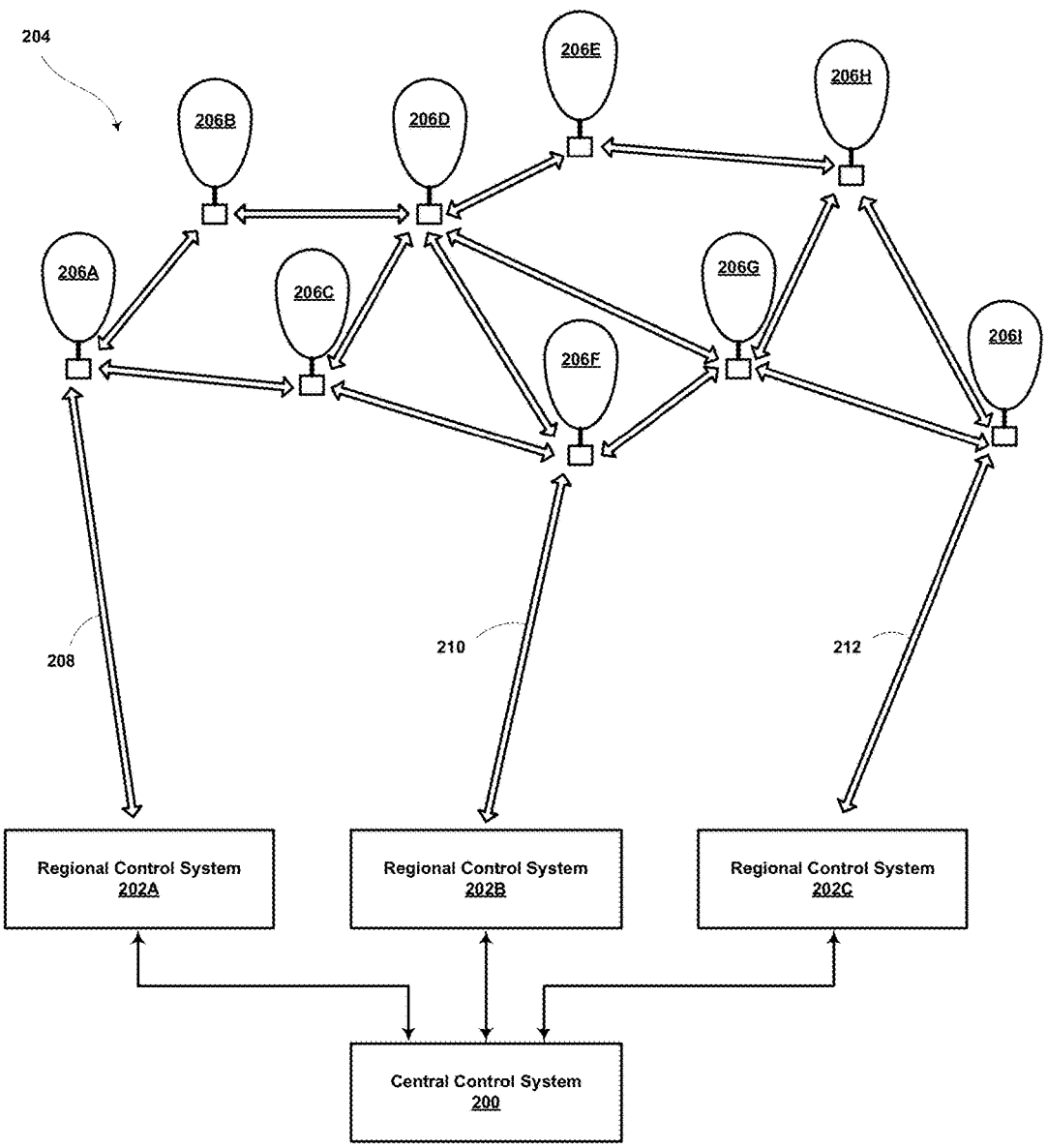
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include position data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_i$ to $d_k$ with respect to each of its k closest neighbors. Each balloon A may treat the distance to each of the k balloons as a virtual spring with a vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_f$, wherein $d_f$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
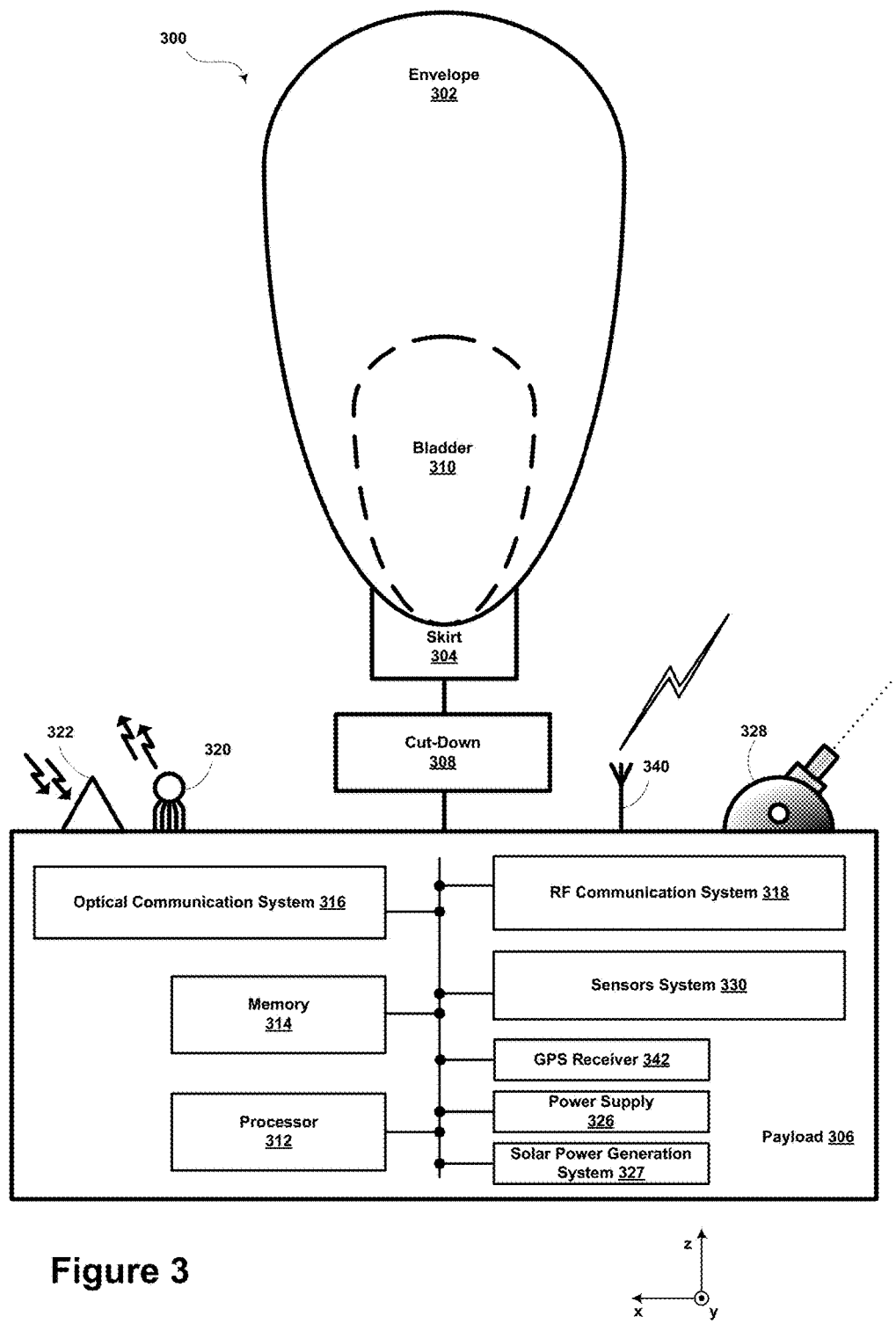
FIG. 3 is a simplified block diagram illustrating a high-altitude balloon, according to an example embodiment.

Various types of balloons may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The optical communication system 316 and/or the RF communication system 318 are examples of communication systems that may include communication interfaces for communications between a balloon and other nodes in a balloon network. It should be understood that other types of communication systems that provide other types of communication interfaces are also possible, and may vary depending upon the particular network implementation.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328 managed by a sensor system 330. For example, payload 306 may include one or more video and/or still cameras, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

The balloon may further include a GPS (or other positioning system) receiver 342 that may process satellite of other types of signals received via the antenna system 340. The antenna 340 system may also be used to broadcast various types of signals. Further discussion relating to receiving and broadcasting signals, particularly in connection with positioning-related features, is provided in greater detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a ridged bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
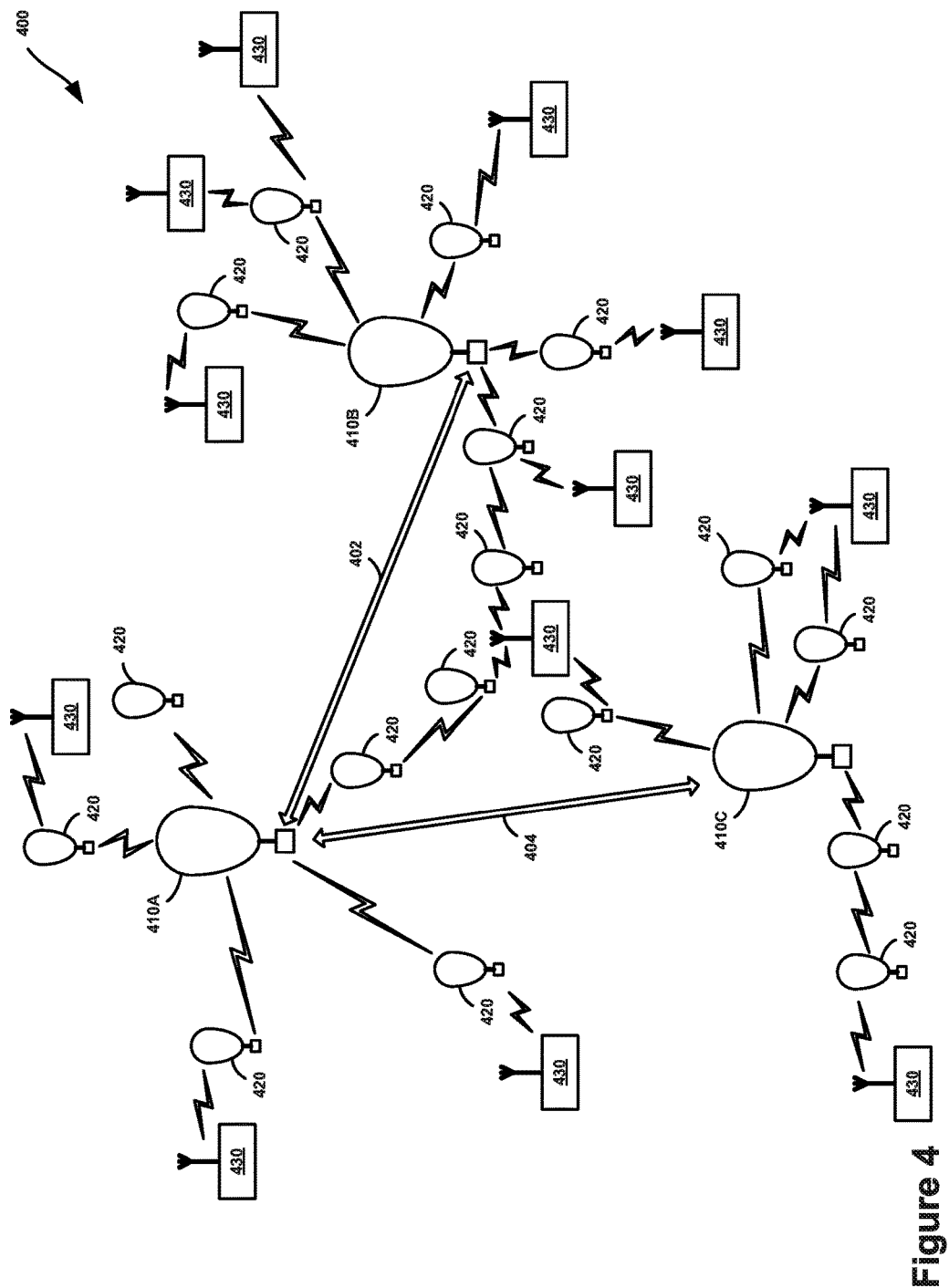
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Embodiments of a Balloon-Based Positioning System

In embodiments of a balloon-based positioning system, each of a plurality of balloons determines its respective position, and then broadcasts a balloon signal containing balloon-positioning data. Among other things, this balloon-positioning data includes the respective determined position. A ground-based receiver may then receive these signals, and determine its own position based on the collective balloon-positioning data contained therein.

Throughout this disclosure, use of the term "ground-based" refers to any location on or proximate to the earth's ground or surface where people typically use devices that may request positioning services. As such, the term is not limited to locations that are literally on the earth's ground, but may also refer to locations in buildings or even on commercial aircrafts. Notably however, the term "ground-based" specifically excludes locations in the stratosphere and above.

Figure 5:
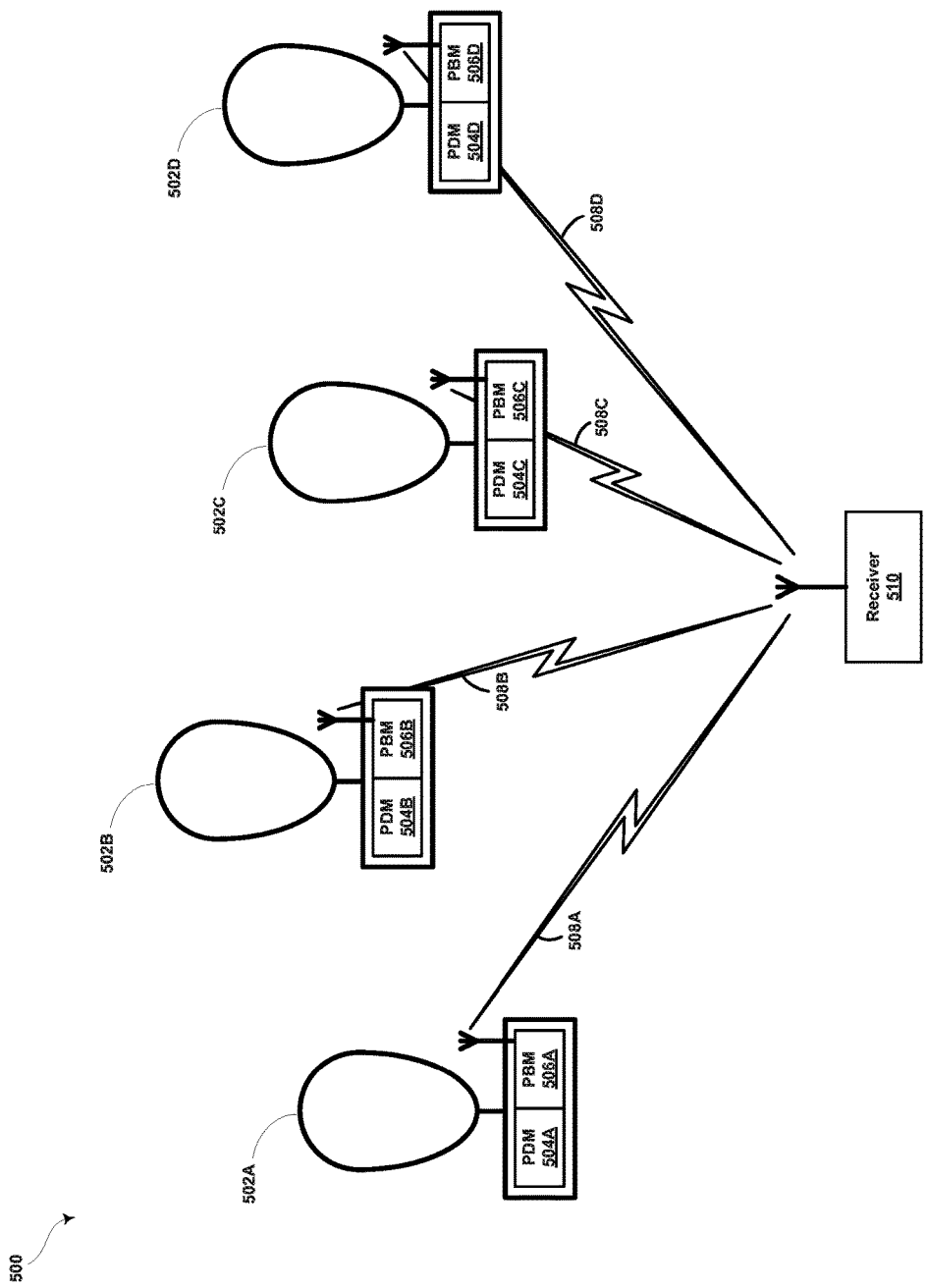
FIG. 5 is a simplified block diagram of a balloon-based positioning system, according to an example embodiment.

FIG. 5 is a simplified block diagram illustrating a balloon-based positioning system 500, according to an example embodiment. As shown, the system 500 includes a plurality of balloons 502A to 502D. As with all of the referenced figures, the particular number of balloons 502 and/or other components shown is not meant to be limiting. Indeed, alternative embodiments may contain more or less balloons and/or other components, depending on the desired arrangement.

Each balloon 502 includes a PDM 504 configured for determining a position of the respective balloon and a PBM 506 configured for broadcasting a balloon signal 508 containing balloon-positioning data. The balloon-positioning data includes the determined position of the respective balloon and a corresponding time of broadcast (i.e., indicating when the balloon signal was broadcast). A receiver 510 is configured to receive one or more of the balloon signals 508 and determine its position based on the collective balloon-positioning data contained therein.

Throughout this disclosure, the terms PDM and PBM are functional modules that each refer to one or a group of components contained in the respective balloon, such as those described in connection with FIG. 3, that may carry out the described functions. For example, the PDM may include a particular set of instructions stored in the memory 314 that relate to the function of determining a position of the respective balloon 300, together with the processor 312 for executing those instructions, and any communication systems or other associated components. However, neither the PDM nor the PMB is limited to any particular set of components. Further, example methods may include any of the functions described herein, any of which may be performed by the balloons, their respective modules or components (e.g., a PDM or PBM), or another entity.

The PDM 504 may be configured in a variety of manners, including for example to use a GPS-based, survey-based, and/or relative-based technique to determine a position of the respective balloon 502. In some embodiments, the PDM 504 may be configured to use portions or combinations of these techniques, as well as others.

4a) Position Determining Module Using a GPS-Based Technique

Figure 6:
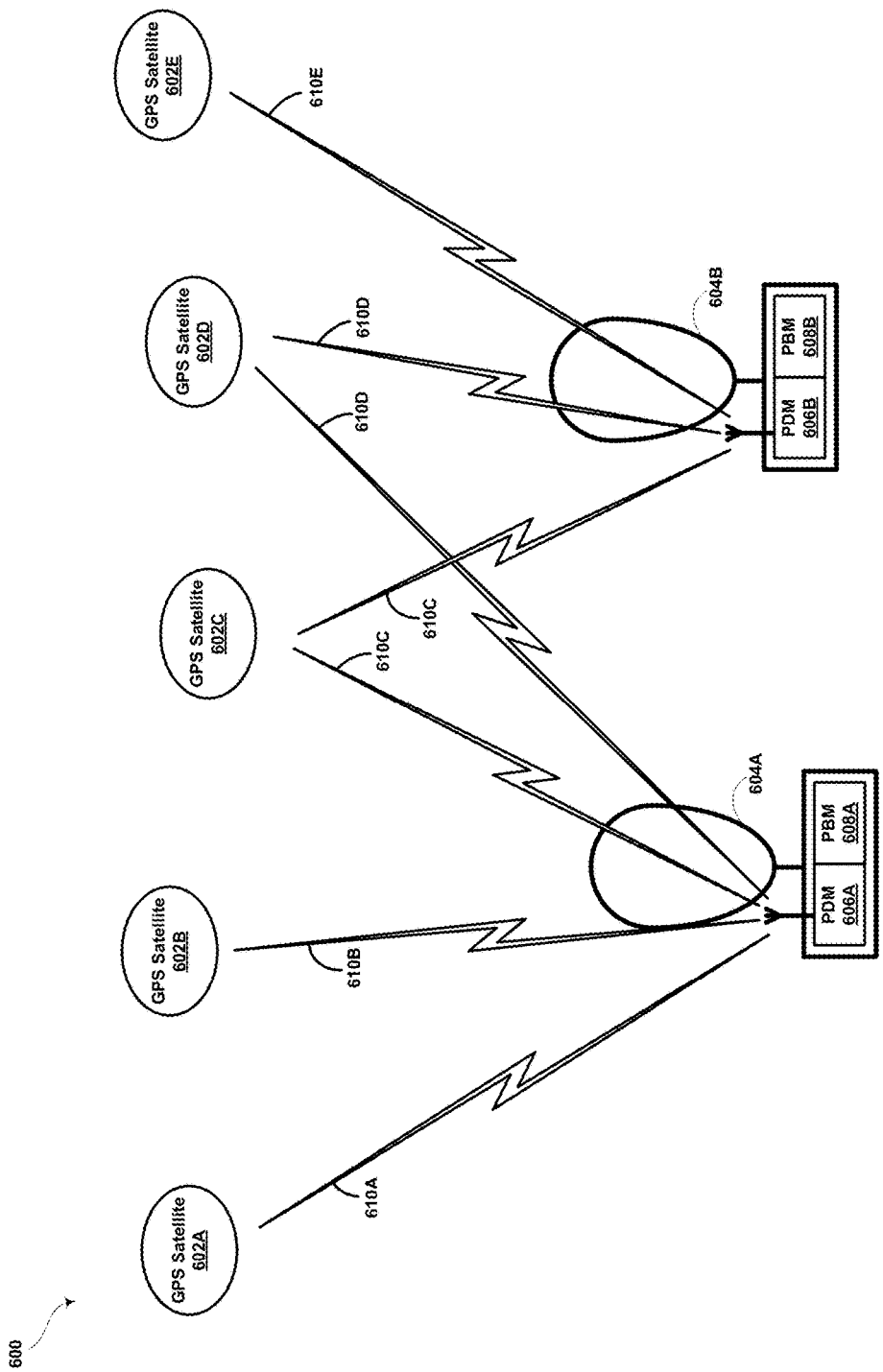
FIG. 6 is a simplified block diagram of a balloon-based positioning system that uses a GPS-based technique to determine a balloon position, according to an example embodiment.

In one embodiment, a PDM 504 may use a GPS-based technique to determine a position of the respective balloon 502. An example system where this technique may be employed is shown in FIG. 6. In particular, FIG. 6 shows a simplified block diagram of a balloon-based positioning system 600 having a plurality of GPS satellites 602A to 602E and two balloons 604A and 604B, each having a respective PDM 606 and PBM 608. Each PDM 606 is configured to use a GPS-based technique to determine a position of the respective balloon 604. Each satellite 602 is a traditional GPS satellite and is configured to broadcast a respective satellite signal 610 containing satellite-positioning data, which may include a position of the respective satellite 602 and a corresponding a time of broadcast, among other things.

Each PDM 606 includes a GPS receiver and an antenna system. Each GPS receiver is configured to receive one or more of the satellite signals 610 via the respective antenna system using techniques now known or later discovered (such as by using a pseudorandom binary sequence code). Note that the same satellite signal 610 may be broadcast once by a satellite 602 and received by multiple balloons 604 (such as with satellite signals 610C and 610D).

Each PDM 606 is further configured to determine a position of the respective balloon 604 by applying one or more position-processing techniques to the satellite-positioning data contained in the received satellite signals 610. The position-processing techniques may include techniques now know or later discovered. For example, the PDM 606 may apply a triangulating technique to satellite-positioning data from at least three satellites 602 to determine the position of the respective balloon 604.

Notably, while satellite-positioning data from three satellites 602 may be sufficient to determine a position of a balloon 604 using a triangulation technique, satellite-positioning data from additional satellites may still be desired. For example, satellite-positioning data from four satellites 602 may be needed to further determine an altitude of the balloon 604 (i.e., in additional to its longitudinal and latitudinal position). Also, as satellite-positioning data from more satellites 602 is received and processed, the PDM 606 may more accurately determine a position of the balloon 604. As such, while the example embodiment in FIG. 6 shows the PDMs 606A and 606B receiving four and three satellite signals, respectively, it should be appreciated that in some embodiments, many satellite signals (i.e., containing satellite-positioning data from additional satellites 602) may be received and processed to determine a position of the respective balloon 604.

Embodiments of the balloon-based positioning system 600 provide a particular advantage in connection with the desire to receive and process multiple satellite signals from different satellites 602. In particular, given the high-altitude arrangement of the balloons 606, the GPS receiver on each balloon has an increased likelihood of having a line-of-sight with multiple satellites 602, as compared to for example, a ground-based GPS receiver, which may have its potential line-of-sight blocked by buildings or other ground-based objects.

Further, even a ground-based GPS receiver located in an open environment (e.g., in an open field) still typically only has a line-of-sight with a maximum of approximately eleven to twelve satellites. This is due to the earth itself acting as an obstruction. However, in the balloon-based positioning system, the high-altitude arrangement of the balloons reduces the likelihood that the earth will be an obstruction. Indeed, a given GPS receiver on a balloon is likely to have a line-of-sight with up to thirteen or even more satellites 602 at any given time.

As another advantage, GPS receivers included on balloons operate above areas where terrestrial interference is typically present. Further, due to the relatively short satellite signal path (e.g., as compared to typical satellite signals that travel all the way to ground-based receivers), signal attenuation is low and received signal strength (RSS) is high.

In alternate embodiments, the PDMs 606 may be similarly adapted to work with non-GPS satellites and/or other positioning systems now known or later discovered.

4b) Position Determining Module Using a Survey-Based Technique

Figure 7:
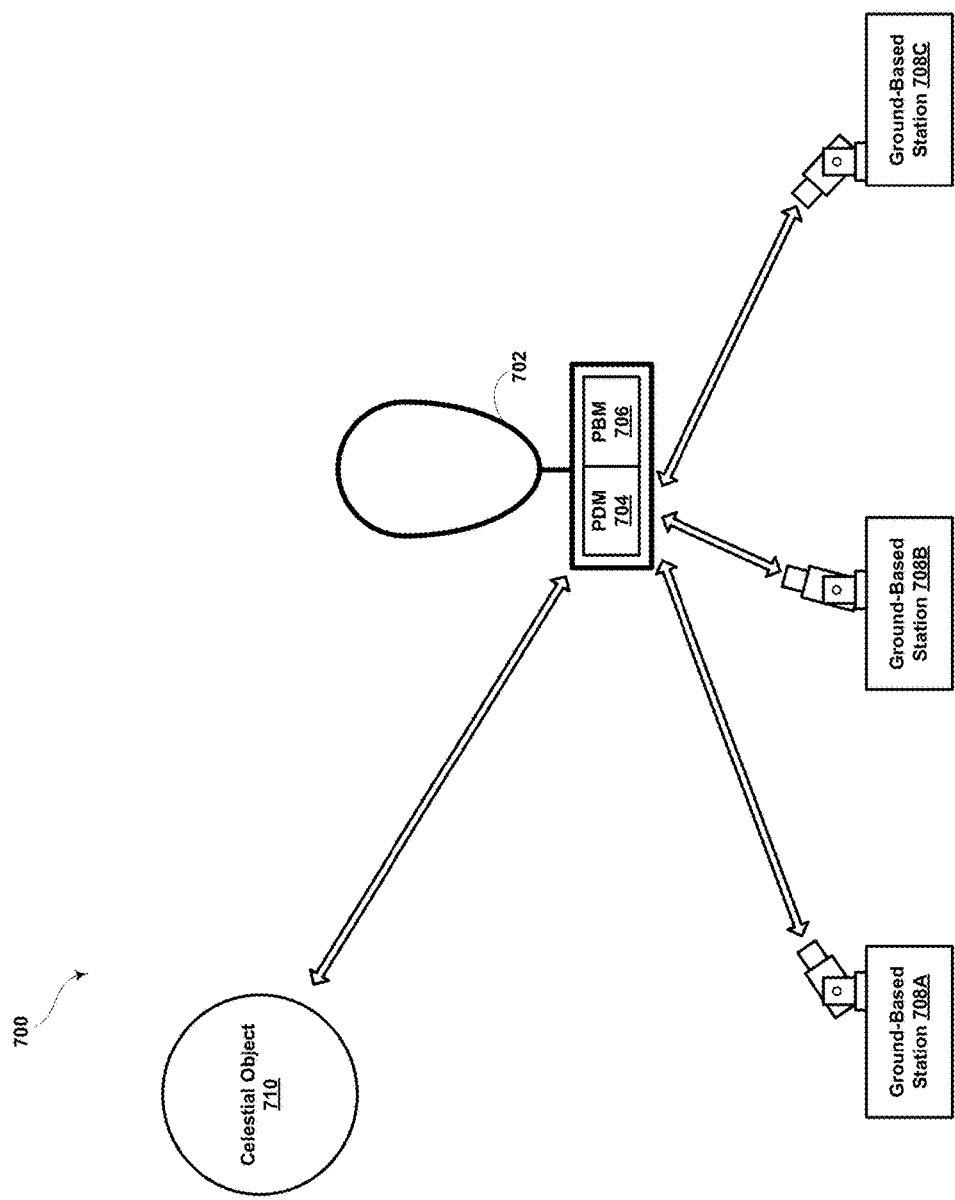
FIG. 7 is a simplified block diagram of a balloon-based positioning system that uses a survey-based technique to determine a balloon position, according to an example embodiment.

In another embodiment, the PDM 504 may use a survey-based technique to determine a position of the respective balloon 502. FIG. 7 shows a simplified block diagram illustrating a balloon-based positioning system 700 including a balloon 702 having a PDM 704 and a PBM 706. The system 700 further includes one or more survey points such as the ground-based stations 708A to 708C and/or a celestial objects 710. The PDM 704 is configured to determine a position of the balloon 702 using a survey-based technique, such as by considering the ground-based stations 708 and/or the celestial object 710.

In one embodiment, the PDM 704 may be configured to identify particular ground-based station 708 by analyzing imaging data of the ground-based station (e.g., obtained from a still camera included in the PDM) and/or by communicating with the ground-based station 708 using any of the communication links descried in this disclosure. Based on the identity of the ground-based station 708, the PDM 704 may determine a position of the ground-based station (e.g., from a look-up table).

The PDM 704 may also be configured to determine a measurement between the balloon 702 and the ground-based station 708, such by further analyzing the imaging data and/or by using one of the disclosed communication links. For example, the PDM 704 may be configured to determine such a measurement by using an optical link between the balloon 702 and the ground-based station 708. In addition to providing a means for exchanging typical network and other data, an optical link may be used to measure distance. For example, the balloon 702 may transmit an optical signal to the ground-based station 708 that includes a time at which the signal was sent. Upon receiving the time-stamped optical signal, the ground station 708 may determine the time it took for the optical signal to travel between the balloon 702 and the ground-based station 708. Then, based on the determined travel time and a known speed of the optical signal, the distance between the balloon 702 and the ground-based station 708 may be determined.

By determining a distance from the balloon 702 to three or more ground-based stations 708 and the position of each ground-based station, the PDM 706 may use a position-processing technique, now know or later developed, to determine a position of the balloon 702.

The PDM 704 may also be configured to identify the celestial object 710, again such as via an imaging analysis or other techniques. The PDM 704 may further be configured to identify the celestial object (e.g., via a look-up table) and determine an orientation of the balloon 706 based on the identified celestial object. For example, the PDM 704 may determine an orientation of the balloon 702 based on what portion of the celestial object is visible from the perspective of the balloon. The PDM 704 may further be configured to determine the position of the balloon 702 based on the determined measurements of the ground-based station 708 and/or the determined orientation of the celestial object 710.

In some embodiments, data obtained from inertial or other sensors (e.g., wind sensors) included in the PDM 708 may further be used to adjust the determined position of the balloon 706. Likewise, time-of-flight measurements for the balloon 706 may be considered.

4c) Position Determining Module Using a Relative-Based Technique

Figure 8:
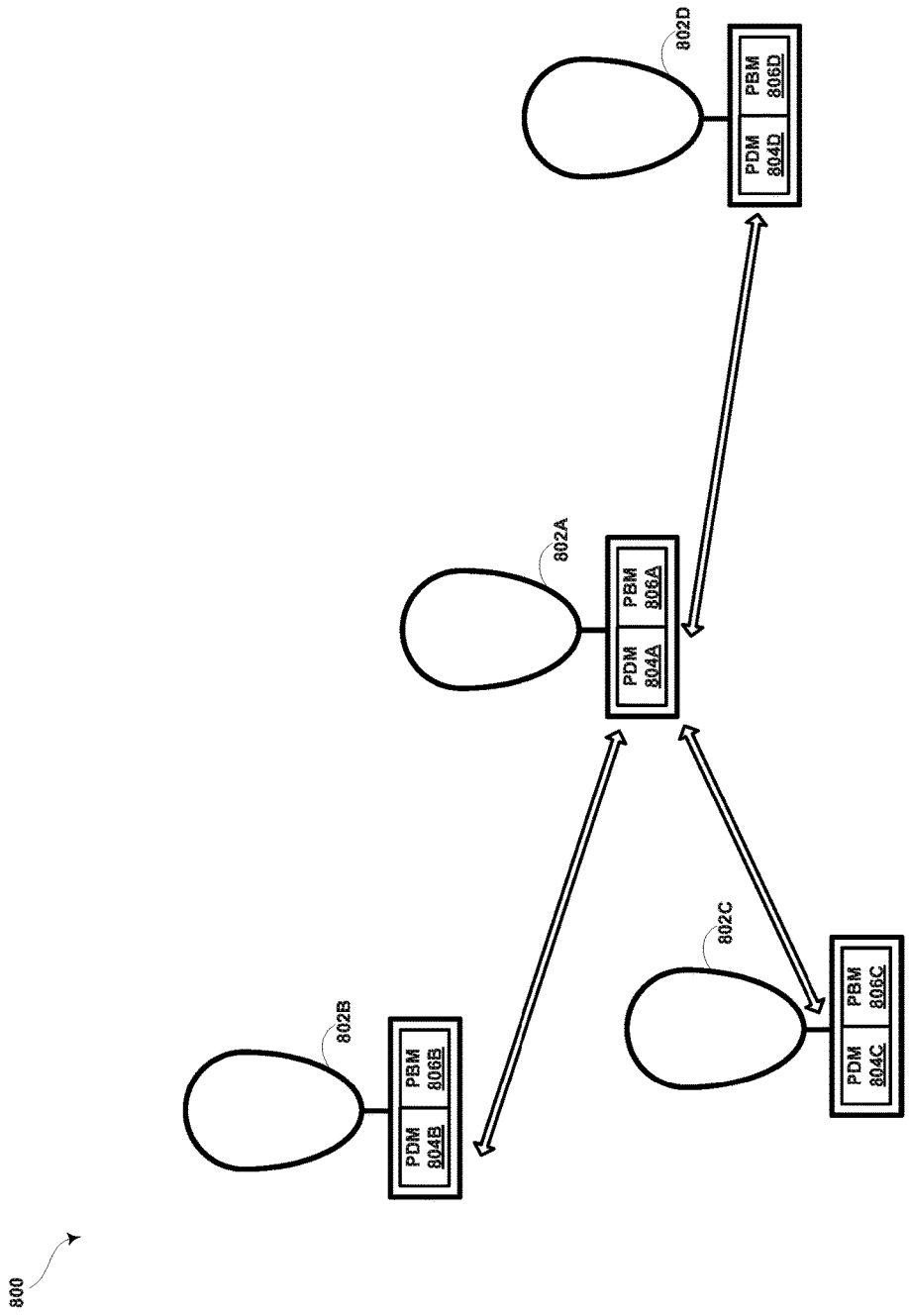
FIG. 8 is a simplified block diagram of a balloon-based positioning system that uses a relative-based technique to determine a balloon position, according to an example embodiment.

In another embodiment, the PDM may use a relative-based technique to determine the position of the balloon 502. FIG. 8 shows a simplified block diagram illustrating a balloon-based positioning system 800 having balloons 802A to 802D. Each balloon 802 has a respective PDM 804 and PBM 806. In the embodiment shown, it may be assumed that the balloons 802B to 802D have already determined their own respective position (i.e., with their respective PDMs 804).

As an example, the PDM 804A may be configured to use a relative-based technique to determine a position of the balloon 802A, namely based on the known position of the balloons 802B to 802D, and a relative position of the balloon 802A with respect to the balloons 802B to 802D. In one embodiment, the PDM 804A may be configured to determine the known position of the balloon 802B by using one of the balloon-to-balloon communication links describing throughout this disclosure. For example, the balloon 802A may send a position request to the balloon 802B via a free-space optical link. In response, the balloon 802B may send its position to the balloon 802A via the optical link.

Likewise, the PDM 804A may be configured to determine a relative position of the balloon 802A with respect to the balloon 802B using one of the described communication links. For example, the balloon 802A may send an optical signal to the balloon 802B that includes a time at which the signal was sent. Upon receiving the time-stamped optical signal, the balloon 802B may determine the time it took for the optical signal to travel between the balloons. Then, based on the travel time and a known speed of the optical signal, PDM 804A may determine a distance between the two balloons.

Notably, communication via optical links is particularly effective at high altitudes, such as when used for balloon-to-balloon communication in embodiments of a balloon-based positioning system. At such altitudes, the atmosphere contains a minimal amount of dust, water, and other atmospheric particles that may interfere with optical signals.

The PDM 804A may then repeat the above-described process to determine the relative position of the balloon 802A with respect to each of the remaining balloons 802C and 208D. These relative positions may then be communicated within the system 800 such that each balloon 802 determines its position with respect to all other balloons 802 in the system. As a result, once one of the balloons 802 determines its position, such as by using one of the position-determining techniques described above, each other balloon in the system 800 may determine its position.

4d) Position Broadcasting Module

Returning to FIG. 5, recall that each balloon 502 includes a PBM 506 that is configured to broadcast (e.g., via an antenna) a respective balloon signal 508 containing balloon-positioning data. The balloon-positioning data includes the determined position of the respective balloon (i.e., as determined by the respective PDM 504) and a corresponding time of broadcast. A balloon receiver 510 is configured to receive one or more of the balloon signals 508 and to determine its position based on the collective balloon-positioning data contained therein. For example, as shown in FIG. 5, the receiver 510 may receive balloon signals 508A to 508D, which collectively contain balloon-positioning data for each of the balloons 502A to 502D. The receiver may then process the balloon-positioning data, by a positioning-processing technique, now know or later discovered, to determine its position.

Notably, in some embodiments, each PBM 506 may broadcast the respective balloon signal 508 on a single channel frequency. This provides a particular advantage over traditional positioning systems, such as the GPS, where satellite signals are typically broadcast simultaneously on two different channel frequencies (typically L1 at 1575.42 Mhz and L2 at 1227.6 Mhz) for the purpose of attempting to detect and remove delay caused by refraction-based interference. Recall that due to the altitude of GPS satellites, satellite signals sent directly to ground-based receivers traverse the ionosphere, and therefore are subject to this type of interference.

Since GPS satellites broadcast satellite signals on two channel frequencies, traditional GPS receivers must be configured to receive both channel frequencies. On the other hand, in embodiments of the balloon-based positioning system where balloon signals are transmitted on a single channel frequency, the corresponding receiver need only be configured to receive a single channel frequency. Among other things, this allows receivers to be less complex, and therefore, typically less expensive to produce. Notably, the single channel frequency that is used may be any particular frequency, although in select embodiments, it may differ from the frequencies of the L1 and L2 or other commonly used frequencies to reduce or avoid potential interference.

Further, due to the relatively slow speed at which the balloons are likely to travel (i.e., as compared to GPS satellites), receivers do not need to compensate for Doppler shifts as is the case with GPS receivers. Again, this reduces the complexity and the production cost of receivers.

4e) Additional Example Advantages

In the context of the GPS, a receiver is often unable to determine its position because it cannot receive the signals being broadcast by one or more of the GPS satellites. These signals may have difficulty reaching GPS receivers for a number of reasons, such as due to weak signal strength and signal interference due to reflection, refraction, and/or multipath propagation. In an attempt to minimize issues concerning weak signal strength, the GPS employs a digital-sequence spread spectrum (DSSS) encoding technique that improves signal strength by utilizing an increased amount of bandwidth. However, this technique only marginally improves signal strength.

As noted, GPS satellites typically orbit the earth at an altitude of approximately 20,000 km. As a result of the satellite signals traveling such a long distance, signal attenuation is often substantial, even with DSSS encoding. On the other hand, in the balloon-based positioning system, balloon signals sent from a balloon to a ground-based receiver travel a substantially shorter distance. In one embodiment, balloon signals travel a distance in the range of approximately 17 km to 25 km. Further, balloon signals destined for a receiver originate beneath the ionosphere, and therefore are not subject to refraction-based interference as discussed above. For these reasons, balloon signals are likely to be stronger, and are more likely to reach receivers, as compared to in a parallel GPS scenario.

Finally, when a given GPS receiver is in certain environments such as cities, tall buildings or other objects may block or interfere with the signals. As discussed, some embodiments of the balloon-based positioning system may include a large number of balloons deployed across the stratosphere. Some embodiments may include thousands, tens of thousands, or even more balloons. As a result, any given ground-based receiver is likely to have a line-of-sight to many balloons, in some embodiments, as many as 50-100 at a time. As a result, a receiver has a much greater likelihood of being able to receive balloon signals, as compared to for example, a GPS receiver that may have lines-of-sight with a maximum of approximately eleven or twelve GPS satellites.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
   at least three balloons, each balloon comprising a position-determining module (PDM) and a position-broadcasting module (PBM),
   each PDM being configured for determining a position of the respective balloon,
   each PBM being configured for transmitting to a receiver, a balloon signal containing balloon-positioning data of the respective balloon to facilitate the receiver determining a position of the receiver, the balloon-positioning data comprising (i) the determined position of the respective balloon and (ii) a corresponding time of broadcast of the balloon signal,
   wherein one balloon of the at least three balloons is a first balloon, and the PDM of the first balloon is a first PDM, the first PDM being configured for determining a position of the first balloon based on a ground-based station and a celestial object,
   wherein the ground-based station and the celestial object are identified from imaging data of each of the ground-based station and the celestial object captured by the first PDM.

2. The system of claim 1, wherein transmitting the balloon signal to the receiver comprises transmitting the balloon signal to the receiver on a single channel frequency.

3. The system of claim 1, wherein the determining the position of the first balloon based on the ground-based station and the celestial object comprises:
   determining a measurement between the first balloon and the identified ground-based station; and
   determining an orientation of the first balloon based on the identified celestial object,
   wherein the determining the position of the first balloon based on the ground-based station and the celestial object comprises determining a position of the first balloon based on the determined measurement and the determined orientation.

4. The system of claim 3, wherein determining the measurement between the first balloon and the identified ground-based station comprises analyzing the imaging data of the ground-based station.

5. The system of claim 3, wherein determining the orientation of the first balloon based on the identified celestial object further comprises determining a portion of the celestial object that is visible from a perspective of the first balloon.

6. The system of claim 1, wherein one balloon of the at least three balloons is a second balloon, and the PDM of the second balloon is a second PDM, the second PDM being configured for determining a position of the second balloon, wherein determining a position of the second balloon comprises:
   determining a relative position of the second balloon with respect to the first balloon; and
   determining a position of the second balloon based on the position of the first balloon and the determined relative position of the second balloon.

7. The system of claim 6, wherein determining the relative position of the second balloon with respect to the first balloon comprises:
   determining the relative position of the second balloon with respect to the first balloon using an optical communication link between the first and second balloons.

8. The system of claim 1, further comprising the receiver, wherein the receiver is configured for (i) receiving each of the transmitted balloon signals; and (ii) using the received balloon signals to determine the position of the receiver.

9. The system of claim 8, wherein the receiver comprises a ground-based receiver.

10. The system of claim 1, wherein each balloon communicates with each other using an optical communication link.

11. The system of claim 1, wherein identifying the ground-based station comprises determining a location of the ground-based station based on a look-up table.

12. A method comprising:
   determining, based on a ground-based station and a celestial object, a first position of a first balloon in a balloon network, the ground-based station and the celestial object are identified from imaging data of each of the ground-based station and the celestial object captured by a position-determining module (PDM);
   determining a second position of a second balloon in the balloon network;
   determining a third position of a third balloon in the balloon network;
   transmitting a first balloon signal to a receiver to facilitate the receiver determining a position of the receiver, the first balloon signal including the determined first position and a corresponding time of broadcast of the first balloon signal;
   transmitting a second balloon signal to a receiver to facilitate the receiver determining a position of the receiver, the second balloon signal including the determined second position and a corresponding time of broadcast of the second balloon signal; and
   transmitting a third balloon signal to a receiver to facilitate the receiver determining a position of the receiver, the third balloon signal including the determined third position and a corresponding time of broadcast of the third balloon signal.

13. The method of claim 12, wherein transmitting the balloon signal to the receiver comprises transmitting the balloon signal to the receiver on a single channel frequency.

14. The method of claim 12, further comprising:
   receiving each of the transmitted balloon signals; and
   using the received balloon signals to determine the position of the receiver.

15. The method of claim 14, wherein the receiver comprises a ground-based receiver.

16. The method of claim 12, wherein the first, second and third balloons communicate with each other using an optical communication link.

17. The method of claim 12, wherein identifying the ground-based station comprises determining a location of the ground-based station based on a look-up table.

18. The method of claim 12, further comprising determining a measurement between the first balloon and the identified ground-based station includes analyzing the imaging data of the identified ground-based station.

19. The method of claim 12, further comprising determining an orientation of the first balloon based on the identified celestial object by a portion of the celestial object that is visible from a perspective of the first balloon.

* * * * *